(12) United States Patent
Pfeffer (10) Patent No.: US 9,203,777 B2
(45) Date of Patent: Dec. 1, 2015

(54) ADAPTIVE BIT RATE ADMISSION CONTROL OF A SHARED RESOURCE

(71) Applicant: Howard Leigh Pfeffer, Reston, VA (US)

(72) Inventor: Howard Leigh Pfeffer, Reston, VA (US)

(73) Assignee: Time Warner Cable Enterprises LLC, New York, NY (US)

(*) Notice: Subject to any disclaimer, the term of this patent is extended or adjusted under 35 U.S.C. 154(b) by 359 days.

(21) Appl. No.: 13/765,062

(22) Filed: Feb. 12, 2013

(65) Prior Publication Data

US 2014/0229604 A1    Aug. 14, 2014

(51) Int. Cl.
*H04L 12/911* (2013.01)
*H04L 12/825* (2013.01)

(52) U.S. Cl.
CPC .............. *H04L 47/822* (2013.01); *H04L 47/25* (2013.01); *H04L 47/70* (2013.01)

(58) Field of Classification Search
CPC ........... H04N 21/2402; H04L 43/0876; H04L 43/0882; H04L 47/25; H04L 47/70; H04L 61/20; H04L 61/2015; H04L 47/822
See application file for complete search history.

(56) References Cited

U.S. PATENT DOCUMENTS

| | | | |
|---|---|---|---|
| 7,853,265 B1* | 12/2010 | Ahmad | 455/453 |
| 2003/0145075 A1* | 7/2003 | Weaver et al. | 709/223 |
| 2004/0165528 A1* | 8/2004 | Li et al. | 370/230 |
| 2011/0126248 A1* | 5/2011 | Fisher et al. | 725/95 |

* cited by examiner

*Primary Examiner* — Brian J Gillis
*Assistant Examiner* — Gil H. Lee
(74) *Attorney, Agent, or Firm* — Chapin IP Law, LLC (57) ABSTRACT

An admission control resource tracks identities of multiple clients in a network environment that share use of a network resource to retrieve content at the same or different adaptive bit rates. The admission control resource further monitors status information indicating an ability of each of the multiple clients to retrieve content at the same or different adaptive bit rates over the shared network resource. Based at least in part on the status information, the admission control resource controls use of the shared network resource by new clients. In other words, as its name suggests, the admission control resource as discussed herein selectively limits how many subscribers are able to use a shared network resource depending on feedback from one or more clients that currently use the shared network resource to retrieve the content at the same or different adaptive bit rates.

22 Claims, 8 Drawing Sheets

ADAPTIVE BIT RATE ADMISSION CONTROL OF A SHARED RESOURCE

BACKGROUND

Conventional Adaptive Bit Rate (ABR) technology can be used to transmit audio and/or video streams to a client's decoder. As a simple example, a network environment can include a server, a communication link, and a client. The client can include a decoder. During operation, and as its name suggests, the decoder receives an encoded data stream over the communication link from a server from which content is retrieved. The decoder decodes the received encoded data stream and initiates playback of respective rendition of content on a playback device.

In accordance with adaptive bit rate technology, bit rates of receiving data to the decoder can be adapted (such as every few seconds) depending on available network bandwidth or other resource bottleneck. As an example, the communication link over which a data stream is transmitted to the decoder (at the client) may experience congestion. In such an instance, the bandwidth for conveying data over the network may significantly drop.

In response to detecting a condition such as a decrease in bandwidth availability, a server can be notified by the client to adaptively change a level of quality or bit rate of data transmitted on a respective communication link to the subscriber playing back the transmitted content. In other words, in accordance with conventional adaptive bit rate decoding, the client can request data encoded at a desired level of quality (or bit rate) in response to detecting network congestion or availability of bandwidth.

Transmitting the encoded data from the server at the lower bit rate or lower level of quality during congestion, as opposed to dropping of required packets transmitted to the decoder at the higher bit rate, enables the recipient to continue playback of the content without interruption, albeit at a lower level of playback quality. Adaptive bit rate technology is useful because a subscriber typically would like to playback streaming content without pauses, even though a media player must occasionally playback content at lower levels of quality.

BRIEF DESCRIPTION OF EMBODIMENTS

Conventional techniques of distributing adaptive bit rate content suffer from a number of deficiencies. For example, in many instances, as previously discussed, users must share available bandwidth to retrieve content. Congestion can eventually occur when too many users share the available bandwidth and attempt to retrieve content at higher adaptive bit rates. That is, there is a point at which use of a shared communication link by too many subscribers requesting retrieval of content results in a lower overall bit rate of playback by all of the respective subscribers because the available bandwidth does not support simultaneous retrieval of high bit rates of different content by all subscribers.

Embodiments herein deviate with respect to conventional techniques. For example, one embodiment herein is directed to controlling the number of subscribers that are granted access to a shared network resource (e.g., communication link, network segment, channel, bandwidth, etc.) to selectively retrieve content at the same or different adaptive bit rates. As discussed below, in one embodiment, the shared network resource can represent a quantum of shared capacity or resources in, for example, a network environment used by the multiple clients to retrieve content at the same or different adaptive bit rates.

More specifically, in accordance with one embodiment, an admission control resource tracks identities of multiple clients in a network environment that share use of a network resource such as a communication link, communication medium, bandwidth, etc., to retrieve content via adaptive bit rates. The admission control resource monitors status information indicating an ability of each of the multiple clients to retrieve content at the same or different adaptive bit rates over the shared network resource. Based at least in part on the status information, the admission control resource controls use of the shared network resource by new clients. In other words, as its name suggests, the admission control resource can be configured to selectively limit how many subscribers are able to use a shared network resource based on feedback from one or more clients that simultaneously use the shared network resource to retrieve the content at the same or different adaptive bit rates as selected by subscribers.

In one embodiment, the admission control resource receives the status information as performance feedback from the multiple clients that are granted use of the shared communication link to selectively retrieve adaptive bit rate encoded content. For example, each respective client using the shared communication link selectively retrieves content at adaptive bit rates that are suitable for the respective client. The performance feedback from each respective client can indicate an ability of the respective client to retrieve content at client selected bit rates over the shared communication link. If the respective client is unable to retrieve content at a higher desired adaptive bit rate, then the corresponding status information produced by the respective client indicates that performance of retrieving encoded content over the shared communication link is poor.

If the respective client is able to retrieve content at higher desired adaptive bit rates, then the corresponding status information produced by the respective client indicates that performance of retrieving encoded content over the shared communication link is good.

Collectively, the status information received from the multiple clients that share use of the communication link indicate a degree to which bandwidth is available on the shared communication link. That is, if feedback from the clients granted use of the shared network resource indicates that overall performance of the shared network resource (such as a communication link) is good, there is likely available bandwidth on the shared communication link for use by a new client. If feedback indicates that overall performance of the shared network resource is poor or hit a limit, the new client can be denied access because addition of another client that retrieves data on the shared communication link will likely degrade performance even further.

In accordance with further embodiments, the status information received by the admission control resource can include at least first received status information and second received status information. The first status information can be received from a first client of the multiple clients. The first status information includes feedback specifying a degree to which the first client is able to retrieve requested content over the shared communication link at adaptive bit rates as specified by the first client. The second status information can be received from a second client of the multiple clients. The second status information includes feedback specifying a degree to which the second client is able to retrieve requested content over the shared communication link at adaptive bit rates as specified by the second client. The admission control resource utilizes at least the first status information and the second status information to generate a metric indicating whether bandwidth is available on the shared communication link for other possible subscribers.

The multiple clients can be subscribers that reside in a common service group of a cable network environment (e.g., optical fiber network environment, coaxial cable network environment, hybrid fiber-coaxial cable network environment, etc.). By way of a non-limiting example, the shared network resource can include a portion of bandwidth (e.g., network segment, channel, etc.) in the cable network environment allocated to support retrieval of adaptive bit rate content by the multiple clients in the service group.

As previously discussed, the received status information from multiple clients can indicate a degree of congestion detected on the shared communication link. Responsive to detecting congestion on the shared communication link above a threshold value, the admission control resource can be configured to deny attempts by new clients to use the shared communication link to retrieve content at the adaptive bit rates.

In one embodiment, controlling use of the shared communication link by new clients can include: receiving an access request from a new client to use the shared network resource; and responsive to detecting that the status information (from clients currently using the shared network resource) indicates lack of congestion on the shared network resource, granting the new client access to the shared communication link to retrieve content at the adaptive bit rates.

In accordance with further embodiments, the admission control resource can be configured to track the identities of multiple clients in the network environment that share use of the communication link to retrieve content. For example, in one embodiment, the admission control resource can be configured to receive, from a cable modem gateway interface in a cable network environment, MAC addresses of cable modems through which the multiple clients retrieve the content from one or more different server resources. The admission control resource also receives IP addresses assigned to the multiple clients to retrieve the content. Via the received information, admission control resource produces a map indicating IP addresses of the multiple clients that use the shared communication link to retrieve the content.

The admission control resource can receive status information such as performance feedback messages from each of the multiple clients that uses the shared communication link.

In one embodiment, each of the performance feedback messages includes a corresponding assigned IP address of the client sending the feedback message. The admission control resource utilizes the map to identify which of multiple shared communication links the performance feedback messages pertain using IP addresses in the received performance feedback messages. In other words, via the map, the admission control resource can determine which of multiple shared communication links the feedback pertains. Based on the performance feedback messages received from the multiple clients that use a particular shared network resource, the admission control resource generates a metric indicating a degree to which the shared communication link has available bandwidth to support additional adaptive bit rate retrieval of content.

The admission control resource then controls use of the shared communication link by new clients based on at least in part on the performance metrics. For example, assume that the admission control resource receives one or more requests by new clients to access content. The admission control resource selectively admits use of the shared communication link by the new clients depending on the available bandwidth to support additional adaptive bit rate retrieval of content over the shared communication link. That is, if performance of the shared communication link by a number of existing users is poor (or below a threshold value), the admission control resource may deny use of the shared communication link by one or more new clients. If performance of the shared communication link by a number of existing users is good (or above a threshold value), the admission control resource may allow use of the shared communication link to one or more new clients.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to control of how many clients, subscribers, users, etc., are able to use a shared network resource such as a communication link. The instructions, when executed by a processor of a respective computer device, cause the processor or multiple processors of the system to: track identities of multiple clients in a network environment that share use of a communication link to retrieve content; monitor status information indicating an ability of each of the multiple clients to retrieve content at adaptive bit rates over the shared communication link; and control use of the shared communication link by new clients based at least in part on the status information.

Another embodiment includes a computer readable storage medium and/or system having instructions stored thereon to keep track of clients that are members of a shared network segment, for example, a cable network environment. The instructions, when executed by a processor of a respective computer device, cause the processor or multiple processors of the system to: receive first configuration information indicating addresses assigned to cable modems through which multiple clients have access to content at adaptive bit rates, the first configuration information also indicating a respective shared network segment assigned to each of the cable modems; receive second configuration information indicating network addresses assigned to the multiple clients, the second configuration information also indicating an address of a respective cable modem through which each of the multiple clients has access to the content; and produce a map indicating network addresses of the multiple clients and a corresponding shared network segment over which the multiple clients have access to the content.

The ordering of the steps in the above embodiments has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, hardware alone such as within a processor, within an operating system, within a software application, etc.

As discussed herein, techniques herein are well suited for use in network environments supporting distribution of content at adaptive bit rates. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

As discussed above, by way of a non-limiting example, an admission control resource tracks identities of multiple clients in a network environment that share use of a network resource to retrieve content at adaptive bit rates. The admission control resource monitors status information to keep track of an ability of each of the multiple clients to retrieve content at the adaptive bit rates over the shared network resource. Based at least in part on the status information, the admission control resource controls use of the shared network resource by new clients. For example, by way of a non-limiting example, the admission control resource selectively limits how many subscribers are able to use a shared network resource depending on feedback from one or more clients that currently use the shared network resource to retrieve the content at adaptive bit rates.

Figure 1:
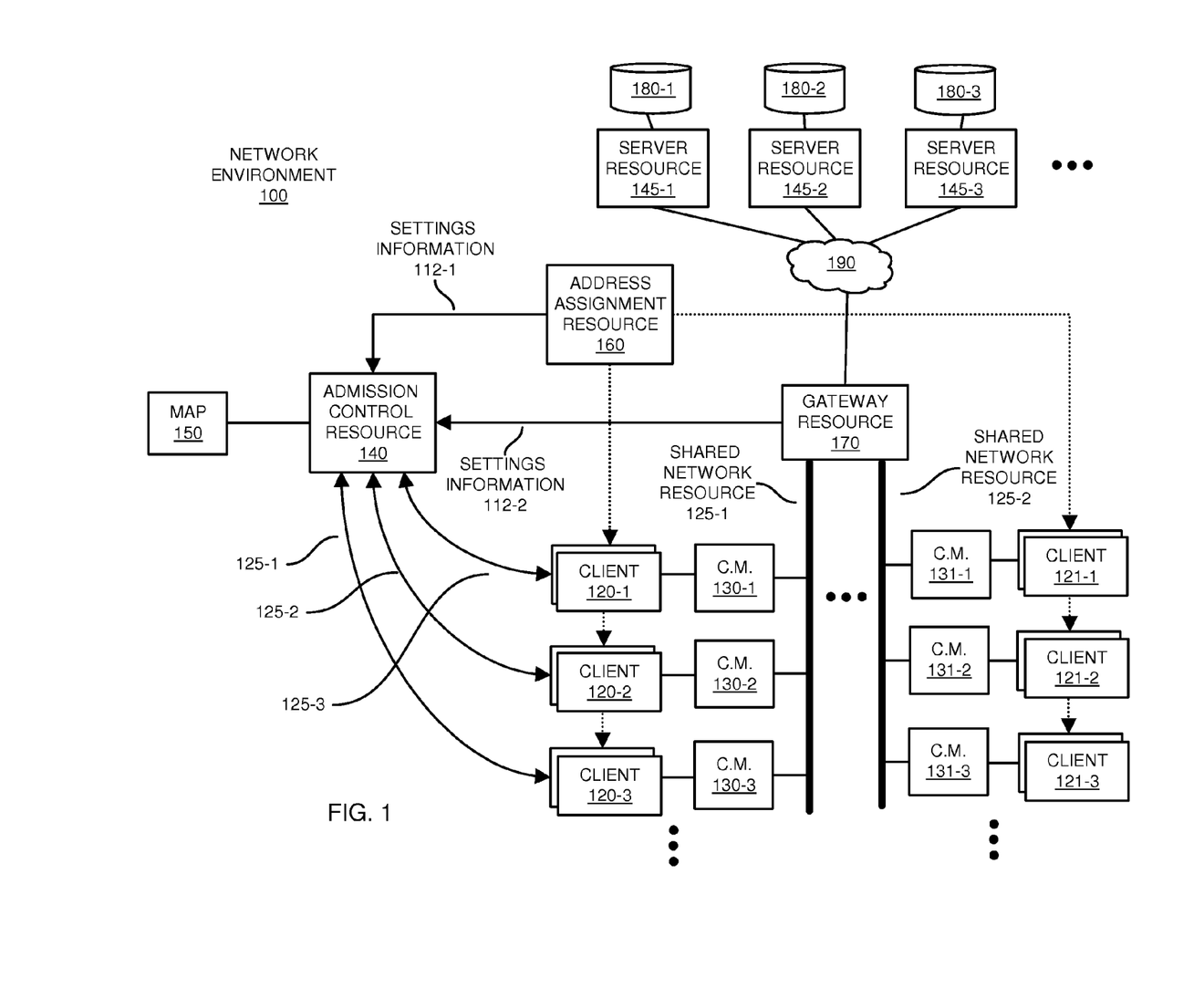
FIG. 1 is an example diagram illustrating a network environment in which an admission control resource facilitates shared use of network resources according to embodiments herein.

FIG. 1 is an example diagram illustrating a network environment according to embodiments herein.

As shown, each of multiple sets of communications resources such as cable modems are in communication with a respective gateway resource 170 such as a one or more CMTS (Cable Modem Termination System).

Note that cable modems 130 are shown by way of a non-limiting example only and can be any suitable type of communication resource. For example, embodiments herein can be implemented in cable networks, wireless networks, passive optical networks, etc.

For example, a first set of cable modems 130 (e.g., cable modem 130-1, cable modem 130-2, cable modem 130-3, ... ) in a first group connect to shared network resource 125-1. Shared network resource 125-1 can be any suitable type of resource (e.g., communication link, bandwidth, channel, coaxial cable, fiber optic link, etc.) that provides connectivity between each of the cable modems 130 and gateway resource 170.

A second set of cable modems 131 (e.g., cable modem 131-1, cable modem 131-2, cable modem 131-3, ... ) connect to shared network resource 125-2. Shared network resource 125-2 can be any suitable type of resource (e.g., communication link, bandwidth, channel, coaxial cable, fiber optic link, etc.) that provides connectivity between each the cable modems 131 and gateway resource 170.

In one embodiment, gateway resource 170 is a logical representation of a cable termination system. The gateway resource 170 can include any of one or more resources or different interfaces facilitating connectivity to other resources in network environment 100.

As mentioned, by way of a non-limiting example, shared network resources 125 can be any suitable type of physical or non-physical resource such as a communication link, communication bandwidth, channel, coaxial cable, fiber optic link, etc.

In one embodiment, each respective cable modem resides in a cable network subscriber's domain such as a home, business, etc. Cable network environment can be or include an optical fiber network environment, coaxial cable network environment, hybrid fiber-coaxial cable network environment, etc.

Via use of shared network resource 125-1, each of the cable modems 130 in a respective first service group of cable subscribers facilitates communications between one or more clients and remote resources in network 190.

For example, in a first subscriber domain, client 120-1 (and possibly one or more additional clients as well) are coupled to cable modem 130-1. Client 120-1 (and/or other client devices) communicates through cable modem 130-1, over shared network resource 125-1, and through gateway resource 170 to communicate with remotely located resources such as server resources 145 (e.g., server resource 145-1, server resource 145-2, server resource 145-3, . . . ). By way of a non-limiting example, a combination of a respective cable modem, shared network resource, and gateway resource support web type communications with servers in network 190. As an example, the client 120-1 can generate a request for retrieval of content. The client 120-1 transmits the request through cable modem 130-1, over shared network resource 125-1, to gateway resource 170. Gateway resource 170 forwards the request for content to the appropriate server resource in network 190 as specified by the request. Gateway resource 170 receives the requested content from the target server resource over network 190 and forwards the received content over shared network resource 125-1 to cable modem 130-1. Cable modem 130-1 forwards the received content to client 120-1.

In a similar manner, each of the clients granted access to use of a shared network resource is able to retrieve selected content.

In a second subscriber domain, client 120-2 (and possibly additional clients) are coupled to cable modem 130-2. Client 120-2 (and potentially additional clients in the second subscriber domain) communicates through cable modem 130-2, over shared network resource 125-1, and through gateway resource 170 to communicate with resources such as server resources 145 (e.g., server resource 145-1, server resource 145-2, server resource 145-3, . . . ).

By way of a non-limiting example, a combination of a respective cable modem, shared network resource, and gateway resource support web type communications with servers in network 190.

Assume that in a third subscriber domain, client 120-3 (and possibly additional clients) are coupled to cable modem 130-3. Client 120-3 (and any additional clients) communicates through cable modem 130-3, over shared network resource 125-1, and through gateway resource 170 to communicate with resources such as server resources 145 (e.g., server resource 145-1, server resource 145-2, server resource 145-3, . . . ).

By way of a non-limiting example, each of the clients 120 can reside within a group such as a service group of a cable network environment. In such an instance, client 120-1, client 120-2, client 120-3, etc., can potentially use shared network resource 125-1 to communicate with remote resources.

Via use of shared network resource 125-2, each of cable modems 131 (in a second service group) facilitates communications between one or more clients and remote resources in network 190.

Assume that in a fourth subscriber domain, client 121-1 (and possibly additional clients) are coupled to cable modem 131-1. Client 121-1 communicates through cable modem 131-1, over shared network resource 125-2, and through gateway resource 170 to communicate with resources such as server resources 145 (e.g., server resource 145-1, server resource 145-2, server resource 145-3, . . . ).

Assume that in a fifth subscriber domain, client 121-2 (and possibly additional clients) are coupled to cable modem 131-2. Client 121-2 communicates through cable modem 131-2, over shared network resource 125-2, and through gateway resource 170 to communicate with resources such as server resources 145 (e.g., server resource 145-1, server resource 145-2, server resource 145-3, . . . ).

Assume that in a sixth subscriber domain, client 121-3 (and possibly additional clients) are coupled to cable modem 131-3. Client 121-3 communicates through cable modem 131-3, over shared network resource 125-2, and through gateway resource 170 to communicate with resources such as server resources 145 (e.g., server resource 145-1, server resource 145-2, server resource 145-3, . . . ).

As mentioned, a combination of respective cable modem, shared network resource, and gateway resource can support any suitable type of communications with servers in network 190. For example, a shared network resource can enable a respective client to retrieve content according to an IPTV (Internet Protocol TeleVision) protocol, the shared network resource can enable (emphasis added) respective client to retrieve content via video on demand, etc.

Via such communications through cable modem, shared network resource, and gateway resource, the clients are able to transmit to and receive data from resources in network 190.

Thus, clients 121-1, client 121-2, client 121-3, etc., can potentially use shared network resource 125-2 to communicate with remote resources.

As shown, network environment 100 further includes admission control resource 140. As its name suggests, in accordance with one embodiment, admission control resource 140 controls how many of the clients 120 are granted permission to use a respective shared network resource 125 to retrieve content from one or more remote resources.

In an example embodiment, each of clients can include a media player application to play back retrieved content on a respective display screen. The content can be retrieved in accordance with any suitable protocol used to convey content. In one embodiment, each client can request retrieval of selected content (e.g., a particular movie, television show, etc.).

Each client can receive a so-called manifest file indicating different network addresses from which to retrieve corresponding selected content at the same or different bit rates. For example, a first manifest file can indicate different bit rates available for retrieving first content; a second manifest file can indicate different bit rates available for retrieving second content; a third manifest file can indicate different bit rates available for retrieving third content; etc.

Each manifest file specifies different addresses (e.g., web addresses, servers, etc.) from which to retrieve different segments of respective content for playback. For example, each of the different available content is partitioned into contiguous segments and made available at different levels of quality. Higher levels of quality of segments are encoded at higher adaptive bit rates; lower levels of quality of segments are encoded at lower adaptive bit rates. Each manifest file specifies different server resources from which to retrieve the different adaptive bit rates of encoded content.

By further way of a non-limiting example, each client can initiate retrieval of content for play back via use of adaptive bit rates. For example, the client can retrieve a first segment of content at a low bit rate. The client can retrieve the next segment of the content at a same, higher, or lower bit rate depending on availability of bandwidth.

An example of clients retrieving content at different adaptive bit rate and playing back content at different levels of quality is discussed in related U.S. patent application Ser. No. 13/441,355 entitled "Variability in Available Levels of Quality of Encoded Data," filed on Apr. 6, 2012, the entire teachings of which are incorporated herein by this reference.

In one embodiment, the client keeps track of which next segment of content must be retrieved in order to substantially playback without interruption. As mentioned, if appropriate bandwidth is available in a network to retrieve higher level of quality content, in accordance with the manifest, the client retrieves content from a respective server that serves the segment of content at a high bit rate. If appropriate bandwidth is not available to retrieve the segment of content at a higher level of quality content, in accordance with the manifest, the client retrieves content from a respective server that serves the segment of content at a lower bit rate.

Thus, depending on conditions such as an ability of a client to decode retrieved segments of content, network congestion, etc., each client adapts retrieval of requested content at different adaptive bit rates that are suitable for uninterrupted playback of respective requested content.

In one embodiment, each client pulls a respective segment of encoded content via generation of one or more HTTP (Hyper Text Transfer Protocol) requests. Each of multiple different addresses may be available to retrieve a respective next segment of content at different levels of quality or different bit rates. For example, a first specified network address in the manifest file can indicate a first network resource from which to retrieve one or more segments of content encoded according to a first adaptive bit rate; a second specified network address in the manifest file can indicate a second network resource from which to retrieve one or more segments of the content encoded according to a second adaptive bit rate; a third specified network address in the manifest file can indicate a third network resource from which to retrieve one or more segments of content encoded according to a third adaptive bit rate; and so on.

As a more specific example, the client may wish to retrieve a next multi-second segment of content for playback. As set forth in a received manifest file indicating different bit rate and remote resources from to retrieve content at different bit rates, the client can choose a first network address in the manifest file to retrieve the next segment of content from a first server resource according to a first predetermined bit rate; the client can choose a second network address in the manifest file to retrieve the next segment of content from a second server resource according to a second predetermined bit rate; the client can choose a third network address in the manifest file to retrieve the next segment of content from a server resource according to a third predetermined bit rate; and so on.

In accordance with one embodiment, admission control resource 140 tracks identities of multiple clients in a network environment 100 that use shared network resources 125 (e.g., a communication link, communication medium, bandwidth, etc.) to retrieve content at different adaptive bit rates. For example, via communications between the admission control resource 140 and each of the clients 120 over communication links 125, the admission control resource 140 receives status information indicating an ability of the respective clients to retrieve requested content at a desired bit rate over a shared network resource. The received status information from each client can indicate a degree of congestion detected on the shared communication link from the perspective of the client attempting to retrieve content at one or more of the different available adaptive bit rates.

In one embodiment, each of the respective clients provides feedback over individual links such as communication links 125-1, 125-2, 125-3, etc.

The feedback received from each client indicates the ability of a respective client to retrieve content over the respective shared network resource 125.

For example, assume in this example that client 120-1 communicates over communication link 125-1 to provide performance feedback messages to admission control resource 140 regarding use of shared network resource 125-1; client 120-2 communicates over communication link 125-2 to provide performance feedback messages to admission control resource 140 regarding use of shared network resource 125-1; client 120-3 communicates over communication link 125-3 to provide performance feedback messages to admission control resource 140 regarding use of shared network resource 125-1; and so on.

In one embodiment, a media player at a respective client that initiates retrieval of the selected content over the shared network resource includes a network address of the admission control resource 140. The client uses the network address of the admission control resource 140 to forward feedback messages to the acre 140.

As discussed further below, based at least in part on the received feedback (i.e., received status information) from the clients, the admission control resource 140 controls use of the shared network resources 125. As further described herein, the admission control resource 140 selectively limits how many new subscribers are able to use a respective shared network resource depending on feedback from one or more clients that currently use the shared network resource to retrieve the content at different adaptive bit rates.

In one embodiment, the feedback messages received from the clients in network environment 100 include a respective network address (such as a source address) indicating which of the clients transmits the performance feedback message. The clients can use the network address assigned to the admission control resource 140 as a destination address of the feedback messages.

In one embodiment, the admission control resource produces a map 150 based on settings information 120-1 received from a source such as gateway resource 170 and settings information 120-2 received from source such as address assignment resource 160. By further way of a non-limiting example, the admission control resource 140 uses map 150 to determine to which shared network resource a respective performance feedback message pertains.

Additional details are discussed below in the following figures.

Figure 2:
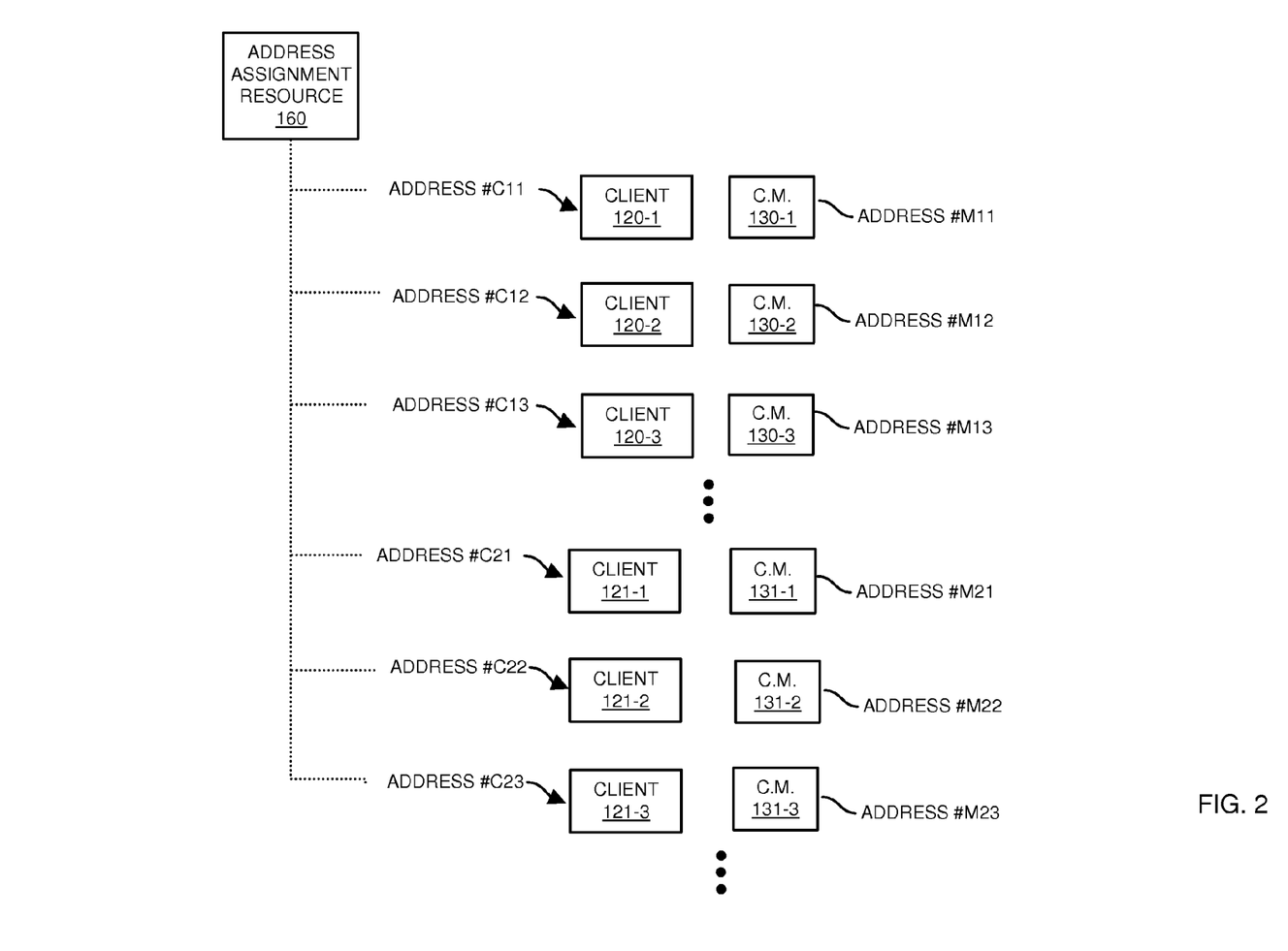
FIG. 2 is an example diagram illustrating assignment of network addresses to clients according to embodiments herein.

FIG. 2 is an example diagram illustrating assignment of network addresses to client resources according to embodiments herein.

In one embodiment, the address assignment resource 160 (such as a Dynamic Host Configuration Protocol server) assigns a respective unique network address (such as an Internet Protocol address) for use by each client in network environment 100.

In this example embodiment, as shown, assume that the address assignment resource 160 assigns network address #C11 to client 120-1; address assignment resource 160 assigns network address #C12 to client 120-2; address assignment resource 160 assigns network address #C13 to client 120-3; address assignment resource 160 assigns network address #C21 to client 121-1; address assignment resource 160 assigns network address #C22 to client 121-2; address assignment resource 160 assigns network address #C23 to client 121-3; and so on.

Each cable modem in network environment 100 is assigned a respective network address (such as a unique Media Access Control address) as well. The network address of the cable modem can be assigned at any suitable time such as at manufacturing, in the field, etc.

In this example, assume that cable modem 130-1 has been assigned network address #M11 (e.g., a first MAC address); cable modem 130-2 has been assigned network address #M12 (e.g., a second MAC address); cable modem 130-3 has been assigned network address #M13 (e.g., a third MAC address); cable modem 131-1 has been assigned network address #M21 (e.g., a first MAC address); cable modem 131-2 has been assigned network address #M22 (e.g., a second MAC address); cable modem 131-3 has been assigned network address #M23 (e.g., a third MAC address); and so on.

Figure 3:
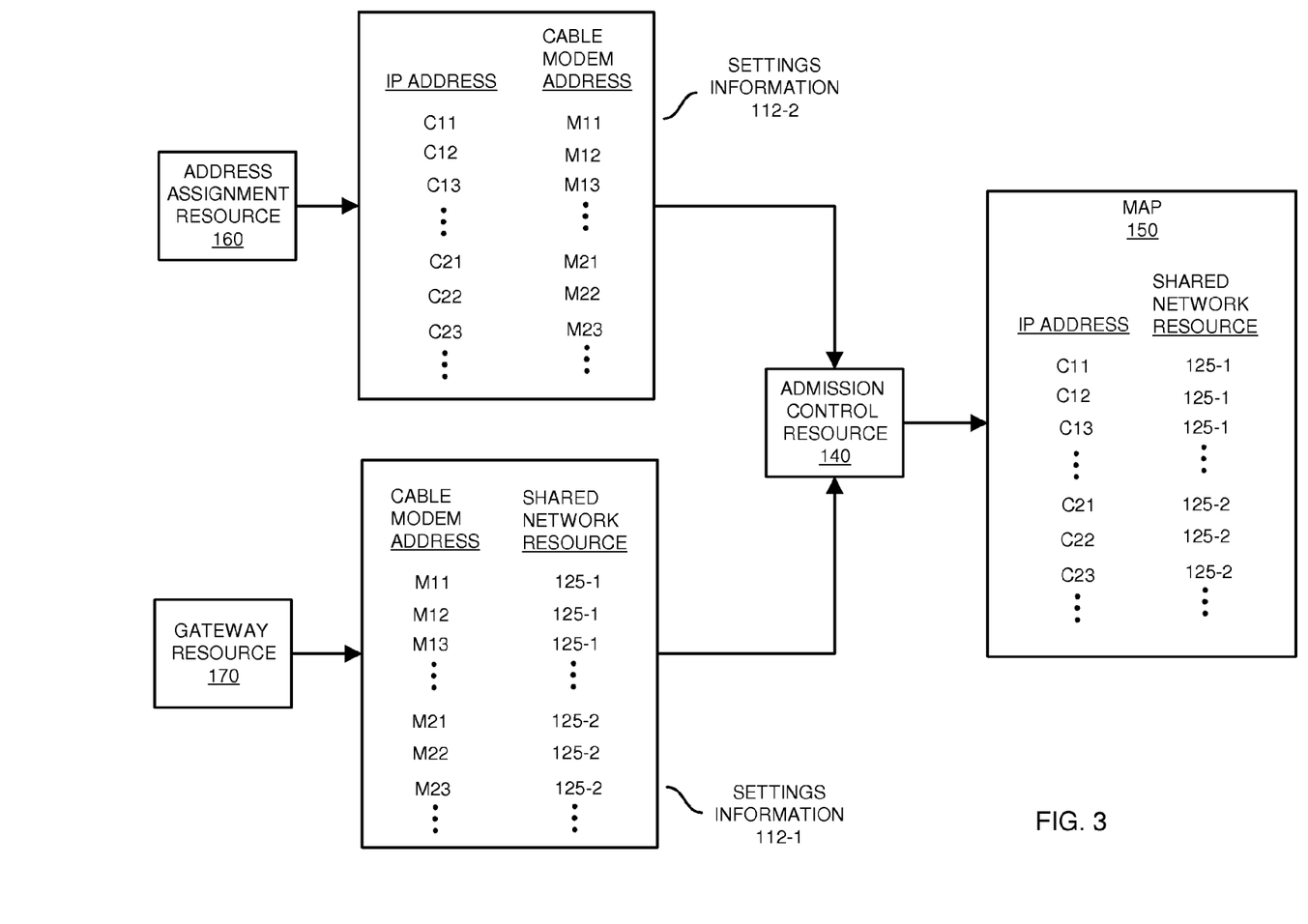
FIG. 3 is an example diagram illustrating generation of a map according to embodiments herein.

FIG. 3 is an example diagram illustrating generation of a map according to embodiments herein.

As shown, address assignment resource 160, which assigns network addresses to the different clients, forwards settings information 112-2 to admission control resource 140. By way of a non-limiting example, the settings information 112-2 can indicate respective IP addresses assigned to client devices and a network address of the respective cable modem through which the client devices communicate.

More specifically, in this example embodiment, assume that a first entry of the settings information 112-2 indicates that client device 120-1 is assigned network address #C11 and communicates through cable modem 130-1 assigned network address #M11; assume that a second entry of the settings information 112-2 indicates that client device 120-2 is assigned network address #C12 and communicates through cable modem 130-2 assigned network address #M12; assume that a third entry of the settings information 112-2 indicates that client device 120-3 is assigned network address #C13 and communicates through cable modem 130-3 assigned network address #M13; . . . ; assume that a fourth entry of the settings information 112-2 indicates that a client device 121-1 is assigned network address #C21 and communicates through cable modem 131-1 assigned network address #M21; assume that a fifth entry of the settings information 112-2 indicates that client device 121-2 is assigned network address #C22 and communicates through cable modem 131-2 assigned network address #M22; assume that a sixth entry of the settings information 112-2 indicates that client device 121-3 is assigned network address #C23 and communicates through cable modem 131-31 assigned network address #M21; and so on.

Note that admission control resource 140 also can be configured to receive settings information 112-1 from gateway resource 170. In one embodiment, the settings information 112-1 indicates the different cable modems that are coupled to or assigned use of a respective shared network resource 125.

More specifically, in this example embodiment, assume that the settings information 112-1 indicates that cable modem 130-1 assigned network address #M11 is coupled to or communicates over shared network resource 125-1; assume that the settings information 112-1 indicates that cable modem 130-2 assigned network address #M12 is coupled to or communicates over shared network resource 125-1; assume that the settings information 112-1 indicates that cable modem 130-3 assigned network address #M13 is coupled to or communicates over shared network resource 125-1; . . . ; assume that the settings information 112-1 indicates that cable modem 131-1 assigned network address #M21 is coupled to or communicates over shared network resource 125-2; assume that the settings information 112-1 indicates that cable modem 131-2 assigned network address #M22 is coupled to or communicates over shared network resource 125-2; assume that the settings information 112-1 indicates that cable modem 131-3 assigned network address #M23 is coupled to or communicates over shared network resource 125-2; and so on.

The admission control resource 140 combines the settings information 112-1 and settings information 112-2 to generate map 150 indicating the different clients that utilize a respective shared network resource 125 to retrieve selected content at the different adaptive bit rates. For example, via a combination of settings information 112-1 and settings information 112-2, the admission control resource 140 produces a first entry of map 150 to indicate that the client device (e.g., client 120-1) assigned IP network address #C11 is assigned to communicate over shared network resource 125-1 to retrieve selected content at different adaptive bit rates; the admission control resource 140 produces a second entry of map 150 to indicate that the client device assigned IP network address #C12 is assigned to communicate over shared network resource 125-1 to retrieve selected content at different adaptive bit rates; the admission control resource 140 produces a third entry of map 150 to indicate that the client device assigned IP network address #C13 is assigned to communicate over shared network resource 125-1 to retrieve selected content at different adaptive bit rates; . . . ; the admission control resource 140 produces a fourth entry of map 150 to indicate that the client device assigned IP network address #C21 is assigned to communicate over shared network resource 125-2 to retrieve selected content at different adaptive bit rates; the admission control resource 140 produces a fifth entry of map 150 to indicate that the client device assigned IP network address #C22 is assigned to communicate over shared network resource 125-2 to retrieve selected content at different adaptive bit rates; the admission control resource 140 produces a sixth entry of map 150 to indicate that the client device assigned IP network address #C23 is assigned to communicate over shared network resource 125-2 to retrieve selected content at different adaptive bit rates; and so on.

Accordingly, in one embodiment, via information (e.g., settings information 112-1 and settings information 112-2) received from multiple resources, the admission control resource 140 tracks the identities of multiple clients in the network environment 100 that share use of a respective shared network resource to retrieve content.

For example, in one embodiment, the admission control resource 140 can be configured to receive, from gateway resource 170 in a cable network environment, MAC addresses of cable modems through which the multiple clients retrieve the content. The admission control resource 140 also receives IP addresses assigned to the multiple clients to retrieve the content. Via the received information, admission control resource 140 produces a map indicating IP addresses of the multiple clients that use the different shared network resource to retrieve the content.

The number of clients that use a respective shared network resource in network environment 100 can vary over time. For example, new clients can be granted use of a respective shared network resource. In such an instance, as new clients are granted use of a respective shared network resource, the admission control resource 140 receives updated settings information 112-1 and updated settings information 112-2. Via the updated settings information 112 from address assignment resource 160 and gateway resource 170, the admission control resource 140 continuously updates map 150 to reflect which users currently have been granted access to or use of the different respective shared network resources.

Figure 4:
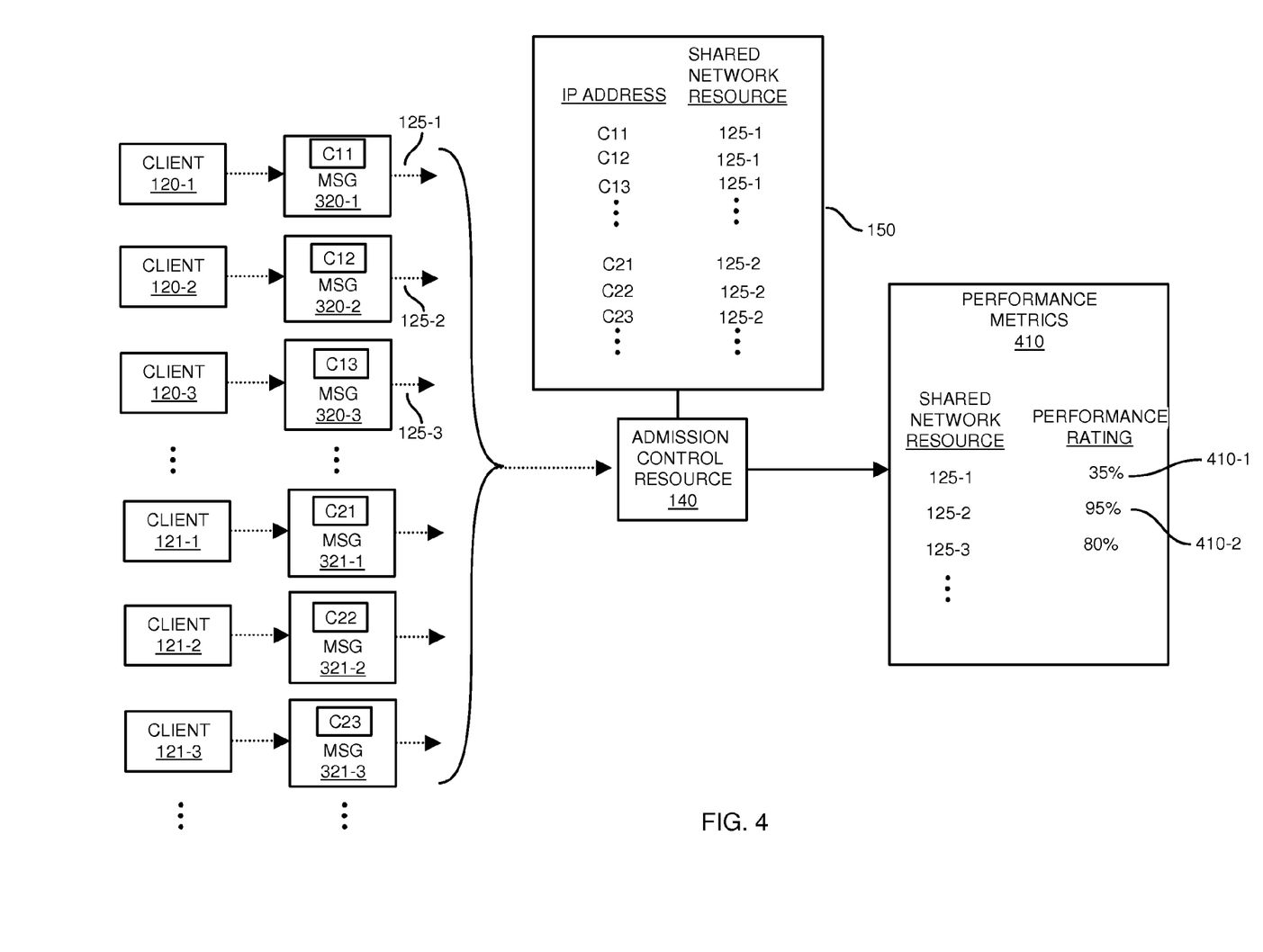
FIG. 4 is an example diagram illustrating receipt of feedback messages from multiple clients and generation of performance metrics information according to embodiments herein.

FIG. 4 is an example diagram illustrating receipt of feedback messages from multiple clients and generation of one or more performance metrics according to embodiments herein.

The admission control resource 140 can receive status information indicating a degree of congestion on each of the shared network resources 125 from any suitable resource.

By way of a non-limiting example, the admission control resource 140 can receive status information such as performance feedback messages 320 from each of the multiple clients that use a respective shared resource. In one embodiment, each of the performance feedback messages 320 includes a corresponding assigned IP address of the client sending the feedback message. In such an instance, the admission control resource 320 utilizes the map 150 to identify which of multiple shared network resources the performance feedback messages pertain using IP addresses in the received performance feedback messages.

In other words, the admission control resource 140 can receive feedback messages from multiple clients indicating whether a respective shared network resource is experiencing congestion. The admission control resource 140 determines which of multiple shared communication links the feedback pertains using the map 150. Based on the performance feedback messages received from the multiple clients that use a particular shared communication link, the admission control resource 140 generates one or more metric indicating a degree to which the shared communication link has available bandwidth to support additional adaptive bit rate retrieval of content.

More specifically, as shown, and as previously discussed, assume that the admission control resource 140 receives feedback messages 320 (e.g., including status information) indicating an ability of the respective client to retrieve selected content at different adaptive bit rates.

For example, assume that each of clients 120-1, 120-2, 120-3, has been granted use of shared network resource 125-1 to retrieve content at different adaptive bit rates. Assume that client 120-1 communicates through cable modem 130-1 and over shared network resource 125-1 to retrieve first content in accordance with different adaptive bit rates as chosen by client 120-1; assume that client 120-2 communicates through cable modem 130-2 and over shared network resource 125-1 to retrieve second content in accordance with different adaptive bit rates as chosen by client 120-2; assume that client 120-3 communicates through cable modem 130-3 and over shared network resource 125-1 to retrieve third content in accordance with different adaptive bit rates as chosen by client 120-3; and so on.

In this example embodiment, the admission control resource 140 receives feedback message 320-1 over communication link 125-1 from client 120-1. The admission control resource 140 uses map 150 to determine which shared network resource in network environment 100 is used by the client 120-1 to retrieve the content and determine to which shared network resource the feedback message 320-1 pertains.

In one embodiment, the admission control resource 140 retrieves the corresponding address information (e.g., network address #C11, the address of the client sending the message 320-1) from received message 320-1 and maps, via map 150, the message 320-1 to shared network resource 125-1. In other words, the admission control resource 140 uses map 150 to determine that the client assigned address network address #C11 (in the message 320-1) uses shared network resource 125-1 to retrieve respective content. The information in message 320-1 indicates an ability of the client 120-1 to retrieve content at desired bit rates.

Further in this example embodiment, assume that the admission control resource 140 receives feedback message 320-2 over communication link 125-2 from client 120-2. The admission control resource 140 uses map 150 to determine which shared network resource in network environment 100 is used by the client 120-2 to retrieve the content and determine to which shared network resource the feedback message 320-2 pertains. In this instance, assume that the admission control resource 140 retrieves the corresponding address information (e.g., network address #C12, the address of the client sending the message 320-2) from message 320-2 and maps, via map 150, the received message 320-2 to shared network resource 125-1. In other words, the admission control resource 140 uses map 150 to determine that the client 120-2 assigned address network address #C12 uses shared network resource 125-1 to retrieve respective content.

Further in this example embodiment, assume that the admission control resource 140 receives feedback message 320-3 over communication link 125-3 from client 120-3. The admission control resource 140 uses map 150 to determine which shared network resource in network environment 100 is used by the client 120-3 to retrieve the content and determine to which shared network resource the feedback message 320-3 pertains. In this example embodiment, assume that the admission control resource 140 retrieves the corresponding address information (e.g., network address #C13, the address of the client sending the message 320-3) from message 320-3 and maps, via map 150, the message 320-3 to shared network resource 125-1. In other words, the admission control resource 140 uses map 150 to determine that the client assigned address network address #C13 uses shared network resource 125-1 to retrieve respective content.

In a similar manner, the admission control resource receives messages 321-1, 321-2, 321-3, etc., from respective clients 121.

The admission control resource uses the received messages 320, 321, etc., to generate a performance metric for each shared network resource in network environment 100.

For example, based on feedback messages 320 received from clients 120, the admission control resource 140 generates performance metric 410-1 indicating a collective ability of the clients 120 (granted use of shared network resource 125-1) to retrieve content at desired adaptive bit rates; based on feedback messages 321 received from clients 121, the admission control resource 140 generates performance metric 410-2 indicating a collective ability of the clients 121 (granted use of shared network resource 125-2) to retrieve content at desired adaptive bit rates; and so on.

In one embodiment, the admission control resource 140 generates performance metrics 410 to reflect whether a respective shared network resource is congested. For example, each of messages 320 can include information generated by the client indicating whether a respective client is able to retrieve content at a highest desired adaptive bit rate. In one embodiment, performance metric 410-1 indicates that 80% of the clients using shared network resource 125-1 are able to retrieve content at the highest bit rate as desired or requested by the respective clients 120.

As mentioned, each of messages 321 can indicate whether a respective client is able to retrieve content at a highest desired adaptive bit rate. In one embodiment, performance metric 410-2 indicates that 95% of the clients using shared network resource 125-2 are able to retrieve content at the highest bit rate as desired or requested by the respective clients 121.

The admission control resource 140 can continuously or occasionally receive feedback messages 320, 321, etc., over time. Based on the continuously received feedback messages, the admission control resource 140 updates the respective performance metrics 410 to current reflect performance of each shared network resource. As discussed below, the admission control resource 140 can be configured to grant use of a respective shared network resource to new clients depending on current performance information.

Figure 5:
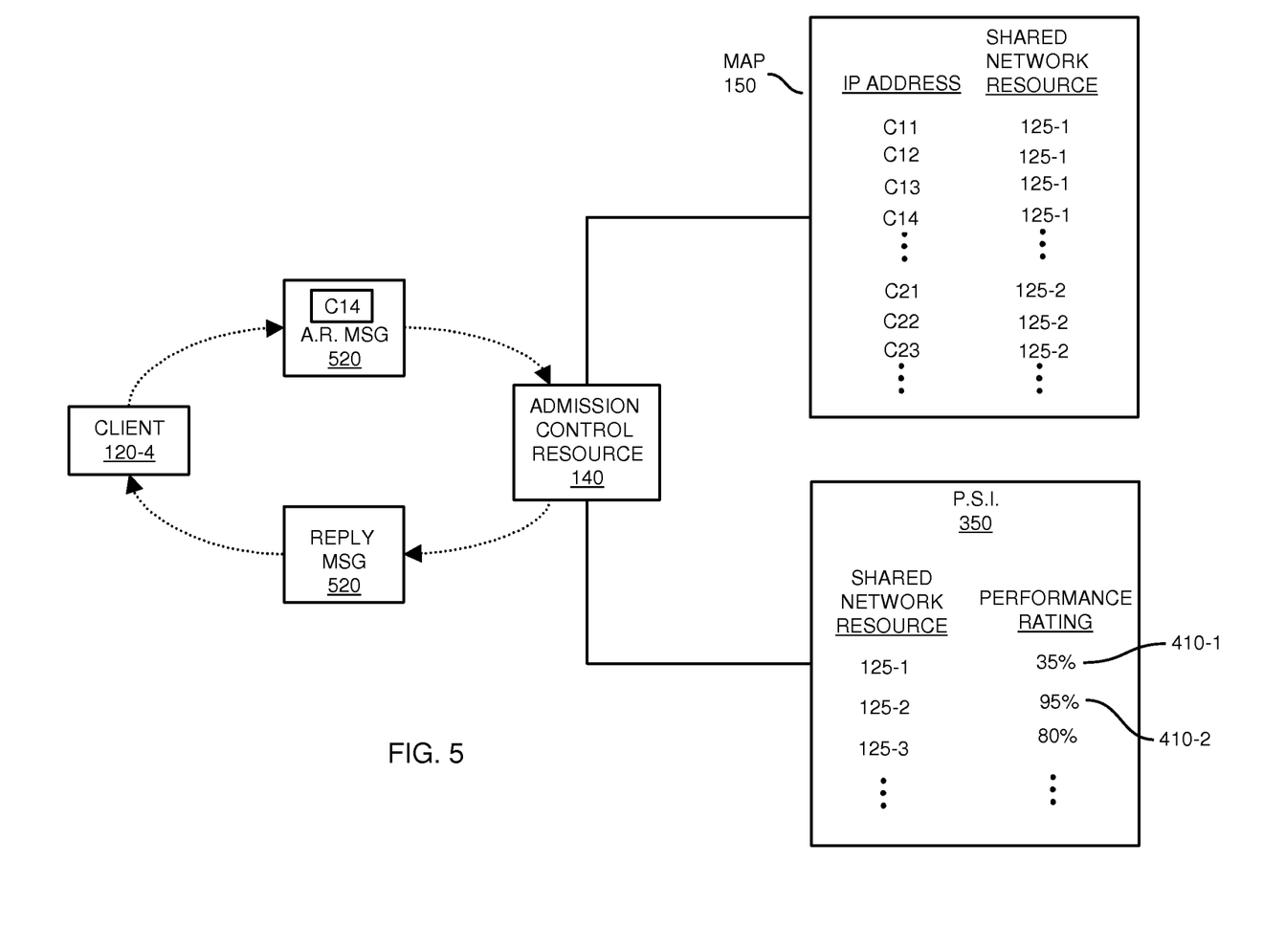
FIG. 5 is an example diagram illustrating receipt of an access request and generation of a corresponding reply message according to embodiments herein.

FIG. 5 is an example diagram illustrating receipt of an access request and generation of a corresponding reply message according to embodiments herein.

In this example, assume that a user operating a computer device logs onto his respective subscriber account. This may require that the user log onto a web site sponsored by a respective service provider. Assume that the subscriber requests use of a shared network resource to retrieve content. In this instance, assume that the address assignment resource 160 assigns network address #C14 to a corresponding client desiring to use shared network resource 125-1 to retrieve selected content.

Assume further that client 120-4 generates an access request message 520 to admission control resource 140. The access request message 520 includes network address #C14, indicating that the access request message 520 is generated by client 120-4. Admission control resource 140 receives the access request message 520 and uses map 150 to detect that the client 120-4 (as specified by network address #C14) has been assigned or is coupled to shared network resource 125-1.

Admission control resource 140 retrieves performance metric 410-1 to determine whether to grant new client 140-4 (such as a media player application) use of shared network resource 125-1 to retrieve content.

In this example, the performance metric 410-1 associated with shared network resource 125-1 is set to 35%, indicating that most clients using the shared network resource 125-1 are not able to retrieve content at a desired adaptive bit rate. Granting client 120-4 would likely increase congestion on the shared network resource 125-1. Hence, in this instance, the admission control resource 140 denies the new client 120-4 use of shared network resource 125-1. If the performance metric 410-1 increases over time above a threshold value such as 85% because many subscribers terminate use of the shared network resource 125-1, the admission control resource 140 can be configured to grant the requesting client 120-4 use of the shared network resource 125-1.

In one embodiment, in response to receiving notification that a given client previously granted use of a shared network resource has terminated use of the shared network resource to retrieve selected content, the admission control resource 140 can be configured to grant a new client access to use of the shared network resource to retrieve content at the different adaptive bit rates.

Note that the performance metric 410-2 is set to a value of 95%. In the event that the admission control resource 140 receives a request by a respective client (coupled through a cable modem to shared network resource 125-2) for permission to use shared network resource 125-2, the admission control resource 140 would grant access to the new client because the performance metric is set 95%, indicating substantially little or no congestion. Granting the new client use of shared network resource 125-2 would likely not have much impact on the shared network resource 125-2.

In this manner, the admission control resource 140 controls use of the shared network resources 125. For example, the admission control resource 140 selectively admits use of the shared network resources 125 by the new clients depending on, for example, available bandwidth that supports additional adaptive bit rate retrieval of content over the shared network resource. That is, if performance of a shared communication link by a number of existing users is poor, the admission control resource 140 may deny use of the shared network resource by one or more new clients. If performance of the shared network resource by a number of existing users is good or above a threshold value such as 80%, the admission control resource 140 can be configured to allow use of the shared network resource by one or more new clients.

Figure 6:
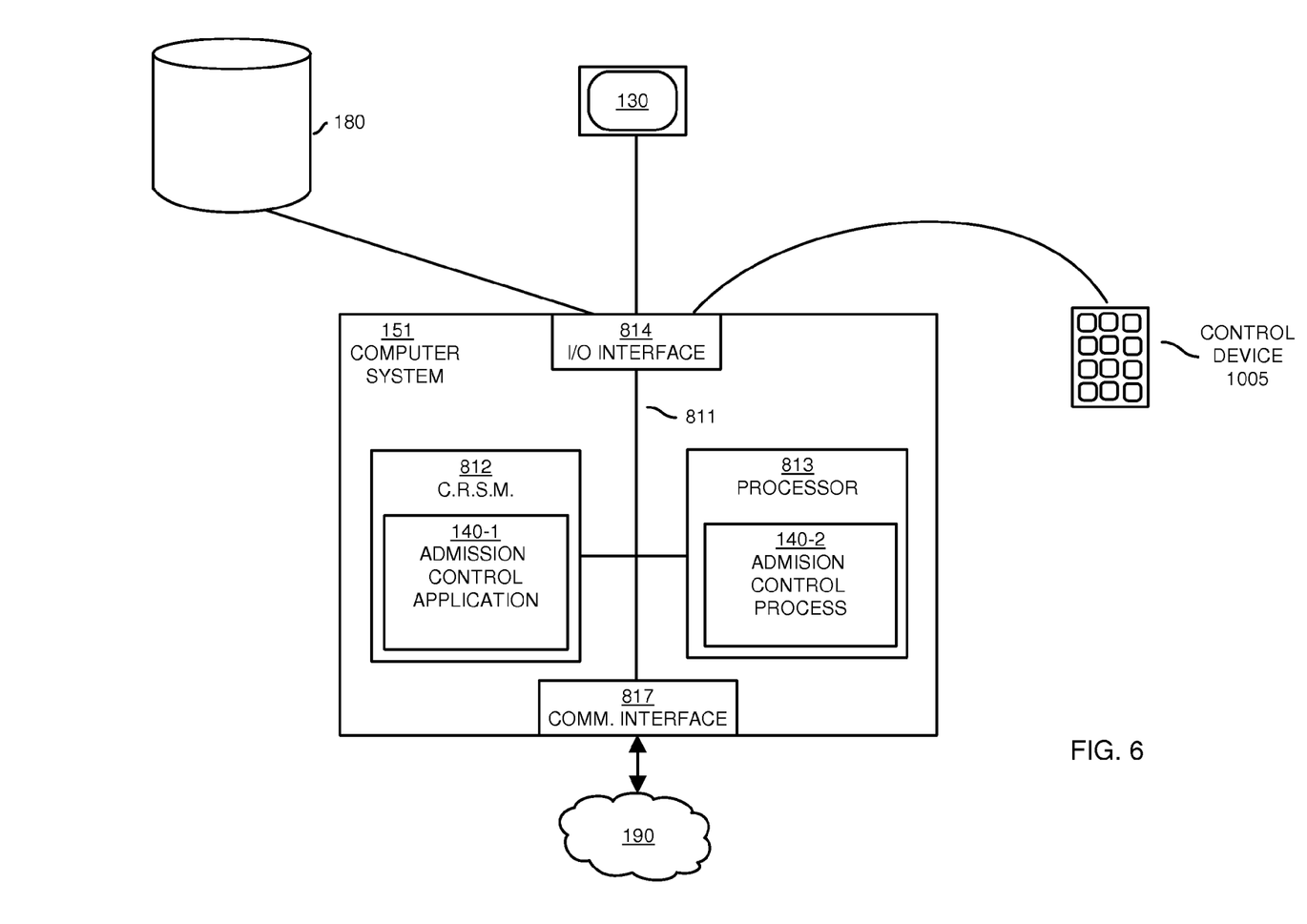
FIG. 6 is a diagram illustrating an example hardware architecture supporting execution of instructions and methods according to embodiments.

FIG. 6 is an example block diagram of a computer system for implementing any of the operations as discussed herein according to embodiments herein.

Computer system 151 can reside any where in network environment 100 and support any of the operations as discussed herein. In one embodiment, the computer system 151 executes admission control application 140-1 to control use of respective shared network resources.

As shown, computer system 151 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 and, if present, other devices such as a playback device 130, keypad 1005, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 151 and processor 813 to communicate over a resource such as network 190 to retrieve information from remote sources and communicate with other computers. I/O interface 814 enables processor 813 to retrieve stored information from repository 180.

As shown, computer readable storage media 812 is encoded with admission control application 140-1 (e.g., software, firmware, etc.) executed by processor 813. Admission control application 140-1 (e.g., encoder application) can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in admission control application 140-1 stored on computer readable storage medium 812.

Execution of the admission control application 140-1 produces processing functionality such as admission control process 140-2 in processor 813. In other words, the admission control process 140-2 associated with processor 813 represents one or more aspects of executing admission control application 140-1 within or upon the processor 813 in the computer system 151.

Those skilled in the art will understand that the computer system 151 can include other processes and/or software and hardware components, such as an operating system that controls allocation and use of hardware resources to execute admission control application 140-1.

In accordance with different embodiments, note that computer system may be any of various types of devices, including, but not limited to, a server resource, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 151 may reside at any location or can be included in any suitable resource in network environment 100 to implement functionality as discussed herein.

Functionality supported by the different resources will now be discussed via flowcharts in FIGS. 7 and 8. Note that the steps in the flowcharts below can be executed in any suitable order.

Figure 7:
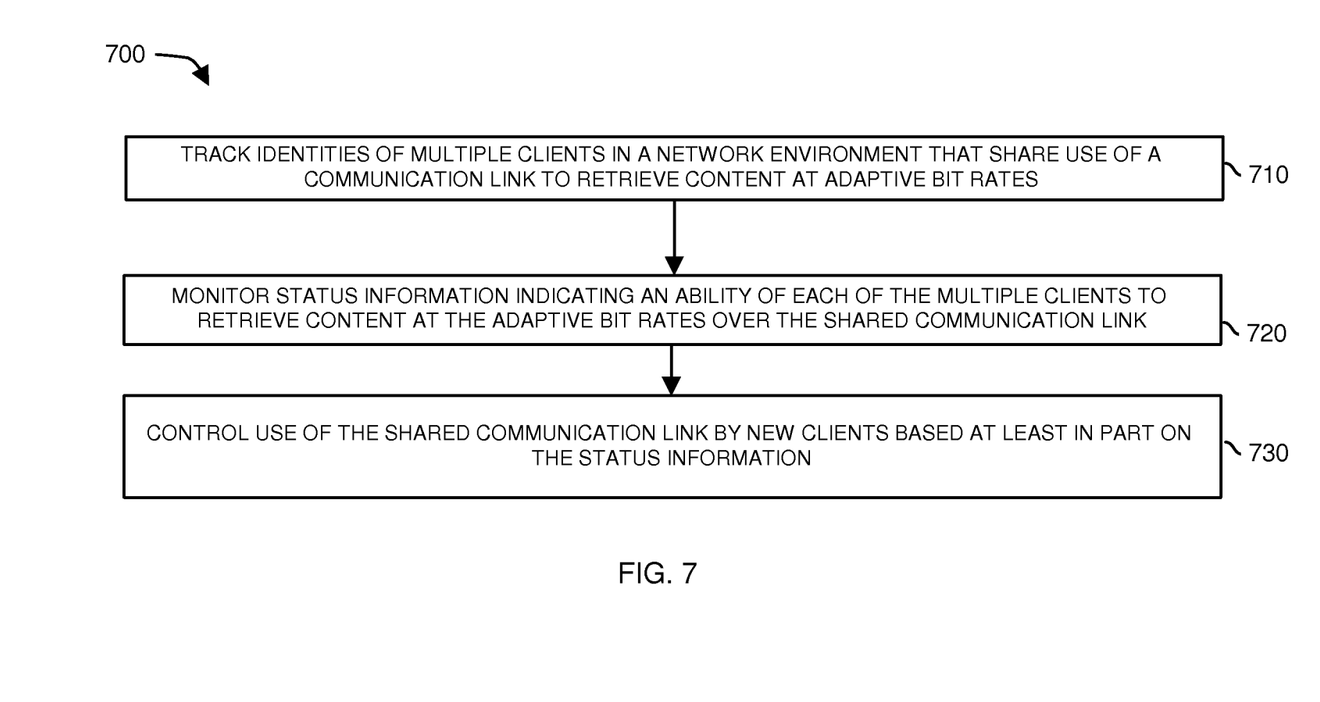
FIGS. 7 and 8 are flowcharts illustrating example methods according to embodiments herein.

FIG. 7 is a flowchart 700 illustrating an example method of controlling use of a network resource according to embodiments. Note that there will be some overlap with respect to concepts as discussed above.

In processing block 710, the admission control resource 140 tracks identities of multiple clients 120, 121, etc., in a network environment 100. The multiple clients share use of network resources such as a one or more communication links to retrieve content at different adaptive bit rates.

In processing block 720, the admission control resource 140 monitors status information such as information received in messages 320, 321, etc., indicating an ability of each of the multiple clients to retrieve content at the different adaptive bit rates over the shared communication link.

In processing block 730, the admission control resource 140 controls use of the shared communication link by new clients based at least in part on the received status information.

Figure 8:
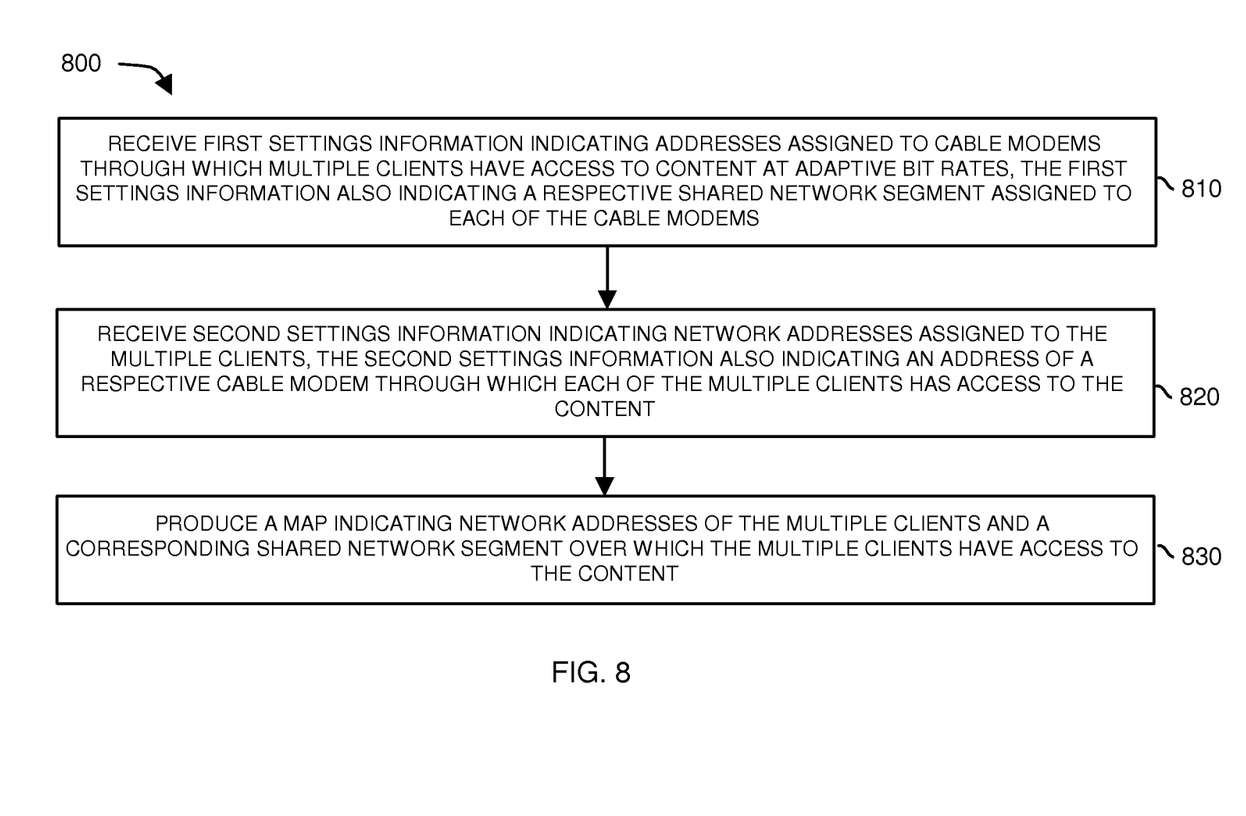

FIG. 8 is a flowchart 800 illustrating an example method of producing a map according to embodiments herein. Note that there will be some overlap with respect to concepts as discussed above.

In processing block 830, the admission control resource 140 Produces a map 150 indicating network addresses of the multiple clients and a Corresponding shared network segment over which the multiple clients have access to the content.

In processing block 820, the admission control resource 140 receives second settings information 120-2 indicating network addresses assigned to the multiple clients 120, 121, etc. The second settings information 120-1 also indicating an address of a respective cable modem through which each of the multiple clients has access to the content.

In processing block 820, the admission control resource 140 produces a map 150 indicating network addresses of the multiple clients and a corresponding shared network segment over which the multiple clients have access to the content.

Note again that techniques herein are well suited for controlling use of shared resources in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
    tracking identities of multiple clients in a network environment that share use of a communication link to retrieve content via adaptive bit rates, each of the multiple clients independently selecting amongst multiple adaptive bit rates to retrieve the content over the shared communication link;
    monitoring adaptive bit rate status information indicating an ability of each of the multiple clients to retrieve content at the adaptive bit rates over the shared communication link; and
    controlling use of the shared communication link by new clients based at least in part on the adaptive bit rate status information;
    wherein monitoring the adaptive bit rate status information further comprises: receiving corresponding adaptive bit rate status information from each respective client of the multiple clients, the corresponding adaptive bit rate status information indicating whether the respective client is able to retrieve content at a respective desired adaptive bit rate over the shared communication link; and
    wherein controlling use of the shared communication link by new clients based at least in part on the adaptive bit rate status information further comprises: producing performance metric information based upon the adaptive bit rate status information received from the multiple clients, the performance metric information indicating a collective ability of the multiple clients to retrieve content at desired bit rates over the shared communication link; and utilizing the performance metric information as a basis to determine whether or not to allow a new client use of the shared communication link to retrieve content.

2. The method as in claim 1 further comprising:
receiving the adaptive bit rate status information as performance feedback from the multiple clients granted use of the shared communication link.

3. The method as in claim 2, wherein receiving the adaptive bit rate status information includes:
receiving first adaptive bit rate status information, the first adaptive bit rate status information received from a first client of the multiple clients, the first adaptive bit rate status information including feedback specifying a degree to which the first client is able to retrieve requested content at adaptive bit rates as selected by the first client;
receiving second adaptive bit rate status information, the second adaptive bit rate status information received from a second client of the multiple clients, the second adaptive bit rate status information including feedback specifying a degree to which the second client is able to retrieve requested content at adaptive bit rates as selected by the second client; and
utilizing at least the first adaptive bit rate status information and the second adaptive bit rate status information to generate a metric indicating whether bandwidth is available on the shared communication link.

4. The method as in claim 1, wherein the adaptive bit rate status information indicates a degree of congestion detected on the shared communication link; and
wherein controlling use of the shared communication link by new clients includes: responsive to detecting congestion above a threshold value, denying the new clients access to the shared communication link to retrieve content at an adaptive bit rate based on a congestion condition as indicated by the adaptive bit rate status information.

5. The method as in claim 1, wherein controlling use of the shared communication link by new clients includes:
receiving an access request from a new client; and
responsive to detecting that the adaptive bit rate status information indicates lack of congestion on the shared communication link, granting the new client access to the shared communication link to retrieve content at the adaptive bit rates.

6. The method as in claim 1, wherein tracking the identities of multiple clients in the network environment that share use of the communication link to retrieve content includes:
receiving, from a cable modem gateway interface in a cable network environment, MAC addresses of cable modems through which the multiple clients selectively retrieve the content;
receiving IP addresses assigned to the multiple clients; and
producing a map indicating IP addresses of the multiple clients that use the shared communication link to selectively retrieve the content.

7. The method as in claim 6 further comprising:
receiving the adaptive bit rate status information as performance feedback messages from each of the multiple clients, each of the performance feedback messages including an assigned IP address;
utilizing the map to identify which of multiple shared communication links the performance feedback messages pertain using IP addresses in the received performance feedback messages; and
based on the performance feedback messages received from the multiple clients that use the shared communication link, generating a metric indicating a degree to which the shared communication link has available bandwidth to support additional adaptive bit rate retrieval of content for the new clients.

8. The method as in claim 7, wherein controlling use of the shared communication link by new clients includes:
receiving requests by the new clients to access content; and
selectively admitting use of the shared communication link by the new clients depending on the available bandwidth to support additional adaptive bit rate retrieval of content over the shared communication link.

9. The method as in claim 1, wherein the multiple clients reside in a common service group of a cable network environment; and
wherein the shared communication link includes a portion of bandwidth in the cable network environment allocated to support selective retrieval of adaptive bit rate encoded content by the multiple clients.

10. The method as in claim 1 further comprising:
in response to receiving notification that a given client has terminated use of the shared communication link to retrieve content, granting a new client access to use of the shared communication link to retrieve content at the adaptive bit rates.

11. The method as in claim 1, wherein the shared communication link represents a quantum of shared capacity in a cable network environment used by the multiple clients to retrieve content at different adaptive bit rates.

12. The method as in claim 1, wherein monitoring the adaptive bit rate status information includes:
receiving feedback messages from the multiple clients, each respective feedback message including an address of a corresponding client that generates the respective feedback message; and
utilizing a map to identify which of multiple shared communication links each respective feedback message pertains.

13. A computer system comprising:
at least one processor device; and
a hardware storage resource coupled to the at least one processor device, the hardware storage resource storing instructions that, when executed by the at least one processor device, cause the at least one processor device to perform the operations of:
tracking identities of multiple clients in a network environment that share use of a communication link to retrieve content at the adaptive bit rates, each of the multiple clients independently selecting amongst multiple adaptive bit rates to retrieve the content over the shared communication link;
monitoring adaptive bit rate status information indicating an ability of each of the multiple clients to retrieve content at the adaptive bit rates over the shared communication link;
controlling use of the shared communication link by new clients based at least in part on the adaptive bit rate status information;
wherein monitoring the adaptive bit rate status information further comprises: receiving corresponding adaptive bit rate status information from each respective client of the multiple clients, the corresponding adaptive bit rate status information indicating whether the respective client is able to retrieve content at a respective desired adaptive bit rate over the shared communication link; and wherein controlling use of the shared communication link by new clients based at least in part on the adaptive bit rate status information further comprises: producing performance metric information based upon the adaptive bit rate status information received from the multiple clients, the performance metric information indicating a collective ability of the multiple clients to retrieve content at desired bit rates over the shared communication link; and utilizing the performance metric information as a basis to determine whether or not to allow a new client use of the shared communication link to retrieve content.

14. The computer system as in claim 13, wherein the at least one processor device further supports operations of:
   receiving the adaptive bit rate status information as performance feedback from the multiple clients granted use of the shared communication link.

15. The computer system as in claim 14, wherein receiving the adaptive bit rate status information includes:
   receiving first adaptive bit rate status information, the first adaptive bit rate status information received from a first client of the multiple clients, the first adaptive bit rate status information including feedback specifying a degree to which the first client is able to retrieve requested content at adaptive bit rates as selected by the first client;
   receiving second adaptive bit rate status information, the second adaptive bit rate status information received from a second client of the multiple clients, the second adaptive bit rate status information including feedback specifying a degree to which the second client is able to retrieve requested content at adaptive bit rates as selected by the second client; and
   utilizing at least the first adaptive bit rate status information and the second adaptive bit rate status information to generate a metric indicating whether bandwidth is available on the shared communication link.

16. The computer system as in claim 13, wherein the adaptive bit rate status information indicates a degree of congestion detected on the shared communication link; and
   wherein controlling use of the shared communication link by new clients includes: responsive to detecting congestion above a threshold value as indicated by the adaptive bit rate status information, denying a new client access to the shared communication link to retrieve content at an adaptive bit rate.

17. The computer system as in claim 13, wherein controlling use of the shared communication link by new clients includes:
   receiving an access request from a new client; and
   responsive to detecting that the adaptive bit rate status information indicates lack of congestion on the shared communication link, granting the new client access to the shared communication link to retrieve content at the adaptive bit rates.

18. The computer system as in claim 13, wherein tracking the identities of multiple clients in the network environment that share use of the communication link to retrieve content includes:
   receiving, from a cable modem gateway interface in a cable network environment, MAC addresses of cable modems through which the multiple clients selectively retrieve the content;
   receiving IP addresses assigned to the multiple clients; and
   producing a map indicating IP addresses of the multiple clients that use the shared communication link to selectively retrieve the content.

19. The computer system as in claim 18, wherein the at least one processor device further supports operations of:
   receiving the adaptive bit rate status information as performance feedback messages from each of the multiple clients, each of the performance feedback messages including an assigned IP address;
   utilizing the map to identify which of multiple shared communication links the performance feedback messages pertain using IP addresses in the received performance feedback messages; and
   based on the performance feedback messages received from the multiple clients that use the shared communication link, generating a metric indicating a degree to which the shared communication link has available bandwidth to support additional adaptive bit rate retrieval of content.

20. The computer system as in claim 19, wherein controlling use of the shared communication link by new clients includes:
   receiving requests by the new clients to access content; and
   selectively admitting use of the shared communication link by the new clients depending on the available bandwidth to support additional adaptive bit rate retrieval of content over the shared communication link.

21. The computer system as in claim 13, wherein the multiple clients reside in a common service group of a cable network environment; and
   wherein the shared communication link includes a portion of bandwidth in the cable network environment allocated to support selective retrieval of adaptive bit rate content by the multiple clients.

22. Computer-readable storage hardware having instructions stored thereon, the instructions, when carried out by a processing device, causes the processing device to perform operations of:
   tracking identities of multiple clients in a network environment that share use of a communication link to retrieve content at different adaptive bit rates, each of the multiple clients independently selecting amongst multiple adaptive bit rates to retrieve the content over the shared communication link;
   monitoring adaptive bit rate status information indicating an ability of each of the multiple clients to retrieve content at the different adaptive bit rates over the shared communication link;
   controlling use of the shared communication link by new clients based at least in part on the adaptive bit rate status information;
   wherein monitoring the adaptive bit rate status information further comprises: receiving corresponding adaptive bit rate status information from each respective client of the multiple clients, the corresponding adaptive bit rate status information indicating whether the respective client is able to retrieve content at a respective desired adaptive bit rate over the shared communication link; and
   wherein controlling use of the shared communication link by new clients based at least in part on the adaptive bit rate status information further comprises: producing performance metric information based upon the adaptive bit rate status information received from the multiple clients, the performance metric information indicating a collective ability of the multiple clients to retrieve content at desired bit rates over the shared communication link; and utilizing the performance metric information as a basis to determine whether or not to allow a new client use of the shared communication link to retrieve content.

* * * * *